Patented Nov. 4, 1947

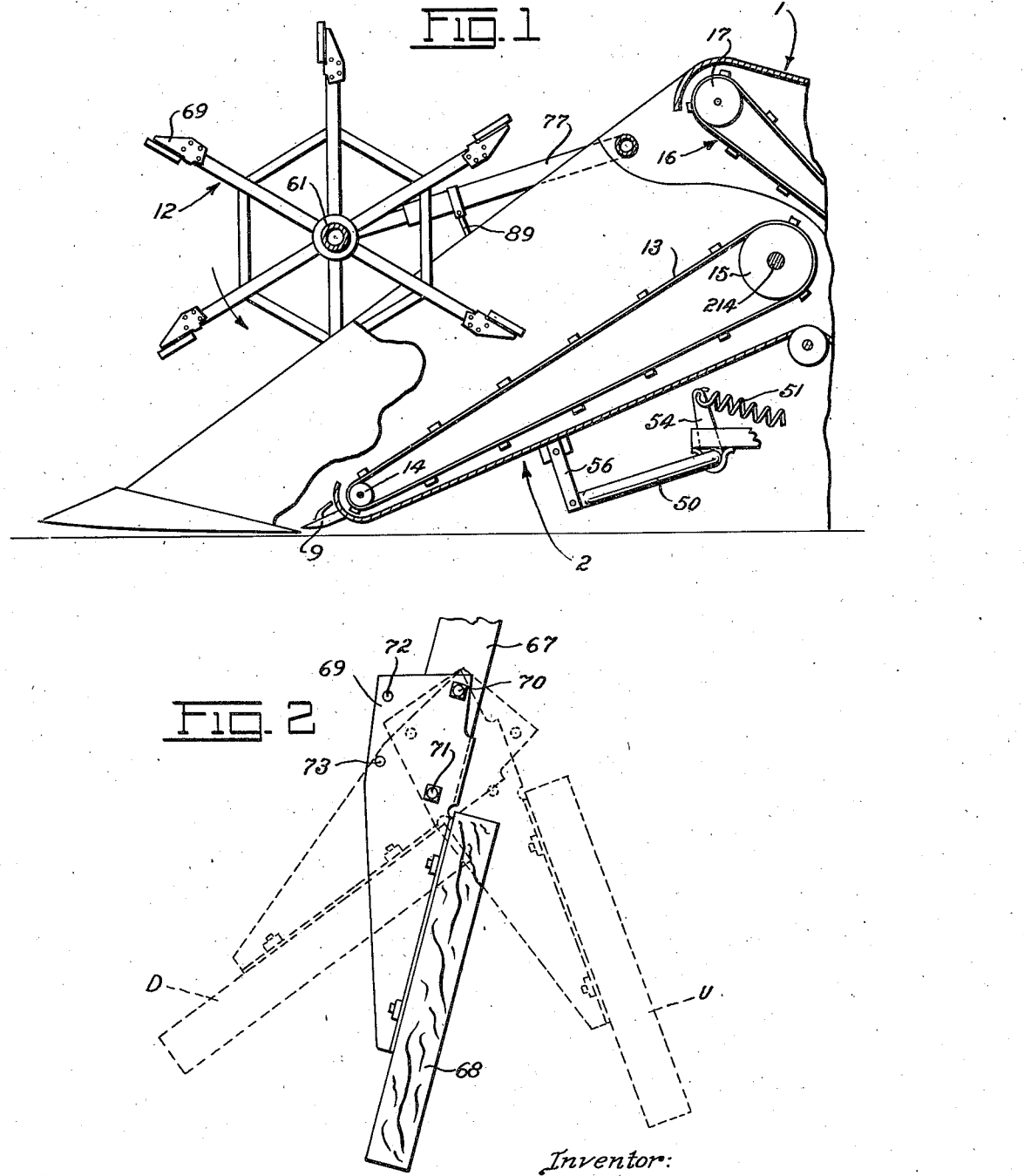

2,430,298

UNITED STATES PATENT OFFICE 2,430,298

COMBINATION HARVESTER-THRESHER

Wallace F. MacGregor, deceased, late of Racine, Wis., by Richard D. Miller, special administrator, Racine, Wis.; said special administrator assignor to J. I. Case Company, Racine, Wis., a corporation Original application February 12, 1940, Serial No. 318,504. Divided and this application July 22, 1944, Serial No. 546,080

1 Claim. (Cl. 56—219)

The present invention relates to combination harvester threshers commonly known as "combines," and particularly to the general purpose type adapted for harvesting grain, beans, peas, and other crop growths, and which combines may be readily transported and operated by a tractor, and an object of the invention is to generally improve the construction and operation of devices of this class, the present application being a division of applicant's co-pending application, Serial No. 318,504, filed February 12, 1940, now Patent No. 2,354,346.

A further object is to provide a machine of this character limited in size and capable of efficient operation with a minimum of manual attendance.

Further objects are to provide improvements in the construction of a reel for a combine.

Other objects and advantages will be apparent from the attached specification and accompanying drawings in which:

Figure 1 is a left side elevation of a portion of a combine with parts removed showing the application of the improved reel thereto.

Figure 2 is an end view of a portion of a reel showing the mounting of the reel bats.

Reels of this nature are commonly associated with combines, in the present instance a combine generally designated as 1 having a harvester portion generally designated as 2 provided with a cutter bar 9 and a feed apron 13 running over rollers 14 and 15, apron 13 serving to elevate grain cut by cutter bar 9 to an apron 16 carried on a roller 17, the grain being fed by aprons 13 and 16 into the threshing mechanism, not shown, for further processing. Harvester 2 is pivoted about a shaft 214 carrying above mentioned roller 15 so as to swing up-and-down thereabout for raising and lowering cutter bar 9. A portion of the weight of harvester 2 is carried on links as 56, pivoted to arms 50 which are given an upward bias by means of a spring 51 acting on an arm 54 to which arms 50 are connected. The grain cut by a harvester such as the above is often of substantial height and to insure its falling on apron 13, a reel generally designated as 12 is disposed substantially above cutter bar 9 and rotated by suitable means not shown in the direction indicated. Reel 12 is carried on a shaft 61 and comprises a paddle wheel, the paddles or bats of which engage the standing grain somewhat in advance of cutter bar 9 and prevent the grains being pushed over by the advancing cutter bar. As the grain is severed from the ground, the motion of the paddles lays the grain in a more or less orderly manner on apron 13 from which it proceeds into the threshing mechanism as above outlined. Reel shaft 61 is supported in suitable bearings carried by supporting arms as 77 in turn supported on struts 89 as fully set forth in applicant's co-pending patent, 2,354,346.

As is well-known, these reels commonly consist of a pair of spiders or supports, each having a plurality of arms 67, the corresponding arms of the respective supports being connected with each other by bats 68 which engage the crop for urging it into contact with the cutter bar of the combine and for laying it on the conveyor. As seen in Fig. 2, bats 68 are adjustably connected to the arms by means of fittings, plates, clamps, or the like 69, bolts or other suitable fastening means 70 and 71 extending through the arms and plates and holding the plates rigidly on the arms.

Under certain conditions it is advisable to set the bats so as to tend to lift the grain and under other conditions it is advisable to set them so as to tend to press the grain down, whereas under most conditions it is preferable to have the bats extend approximately in the plane of the arms 67. In the structure shown, this is readily done by shifting the plates 69.

Suitable means is provided for shifting the plates with relation to the arms as holes 72 and 73. Thus for tilting the bats to tend to press the crop down, bolts 70 are removed and replaced through the arms and holes 72, first bringing holes 72 into registration with the disclosed location of bolts 70. The bats will then be in the dotted position "D." For tilting the bats for lifting a crop, bolts 71 are removed and holes 73 brought into registration with the arms and the bolts replaced, whereupon the bats will be in the dotted position "U." It will be understood that this structure is duplicated for each bat. A reel is thus provided in which the angle of the bats can be altered for varying crop conditions without undue delay or difficulty and also without appreciable complication or expensive mechanism.

The above being a complete description of an illustrative embodiment of the invention, what is claimed as new and desired to be secured by Letters Patent of the United States is:

In a reel for a harvesting machine, including a spider, arms and bats, means for securing the bats to the arms and adapted to secure them in a variety of positions including a plurality of plates, secured to the bats and extending in the direction of and alongside of the arms, registering openings in one of said plates and its associated arm, pivotal attaching means in the openings, a plurality of openings in the plate equally spaced from the first mentioned opening, and an opening in the arm registering in certain positions of the plate with said spaced openings, attaching means engaged in the second mentioned openings for maintaining the plate in one of a plurality of adjusted positions about said pivotal attaching means, an opening in the plate spaced from the second mentioned attaching means, a distance equal to the spacing of the first mentioned attaching means from the second mentioned attaching means, and also spaced from the first mentioned opening in the plate, for securing the plate by means of the first mentioned attaching means in a plurality of adjusted positions when pivoted about the second mentioned attaching means.

RICHARD D. MILLER,
*Special Administrator of the Estate of Wallace F. MacGregor, Deceased.*

REFERENCES CITED

The following references are of record in the file of this patent:

UNITED STATES PATENTS

| Number | Name | Date |
|---|---|---|
| 1,770,077 | Kunz | July 8, 1930 |